(12) United States Patent
Odeohhara et al.

(10) Patent No.: US 6,459,235 B2
(45) Date of Patent: Oct. 1, 2002

(54) CHARGE CONTROL METHOD AND COMPUTER

(75) Inventors: Shigefumi Odeohhara, Yamato; Atsushi Kumaki, Yokohama; Hiroshi Nakagawa, Yamato; Toshitsugu Mito, Atsugi; Tetsuji Nakamura, Yokohama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/731,453

(22) Filed: Dec. 7, 2000

(30) Foreign Application Priority Data

Dec. 8, 1999 (JP) .............................. 11-349306

(51) Int. Cl.[7] .................................. H02J 7/00
(52) U.S. Cl. ......................................... 320/116
(58) Field of Search ............................... 320/116–121; 702/63

(56) References Cited

U.S. PATENT DOCUMENTS 6,236,215 B1 * 5/2001 Kanehira .................... 320/118
6,194,867 B1 * 7/2001 Cummings et al. ......... 320/119
6,262,558 B1 * 7/2001 Weinberg .................... 320/101
6,268,711 B1 * 7/2001 Bearfield .................... 320/116

* cited by examiner

Primary Examiner—Edward H. Tso
Assistant Examiner—Pia F Tibbits
(74) Attorney, Agent, or Firm—J. Bruce Schelkopf; Andrew J. Dillon

(57) ABSTRACT

A charge control method by which batteries can be efficiently charged, even if the charging is aborted, as well as a computer which employs such a charge control method is provided. The charge to the main battery is started and then the charge to the,main battery is stopped when the amount of electric energy in the main battery reaches a predetermined value (steps 200 to 204). Next, the charge to the second battery is started and then the charge to the second battery is stopped when the amount of electric energy in the second battery reaches a predetermined value (steps 206 to 210). Next, the charge to the main battery is restarted and then the charge to the main battery is stopped when the amount of electric energy in the main battery reaches 100%. Thereafter, the charge to the second battery is restarted and then the charge to the battery is stopped when the amount of electric energy in the second battery reaches 100% (steps 212 to 222).

4 Claims, 9 Drawing Sheets

CHARGE CONTROL METHOD AND COMPUTER

BACKGROUND OF THE INVENTION

1. Technical Field

The present invention relates in general to a charge control method and a computer, and in particular to a charge control method for controlling the charge of a plurality of batteries and a computer which employs the charge control method.

2. Description of the Related Art

Recently, with the spread of mobile computing, portable personal computers which vary in size and function (hereinafter referred to as "portable PCs") have been developed. For example, typical portable PCs include notebook personal computers (PCs), subnotebook PCs, palmtop PCs, and personal data assistants (PDAs).

A portable PC has a battery contained in its body. Such a built-in battery allows the user to use the portable PC under circumstances where no commercial electric power is available, for example, in a train. A battery which can be operated many times by recharging is commonly used as a built-in battery.

Under circumstances wherein commercial electric power is available, the user connects the portable PC to an AC adapter (a device which accepts a commercial alternating current (AC) and provides a direct current). This allows desired computing operations to be performed and at the same time, the battery built in the portable PC can be charged.

A single battery has a limited capacity and thus the operating time of a portable PC is also limited. In order to increase the operating time of the portable PC, two batteries may be contained in the portable PC. These two batteries are referred to as the main battery and the second battery, respectively. First, the portable PC starts to operate on the second battery. When the second battery runs down, the portable PC can continue to operate on the main battery instead of the second battery.

In general, a charger has the capability of charging only a single battery at a time and if two batteries must be charged, the main battery is first charged and then the second battery is charged.

SUMMARY OF THE INVENTION

A charge control method by which batteries can be efficiently charged, even if the charging is aborted, as well as a computer which employs such a charge control method is provided. The charge to the main battery is started and then the charge to the main battery is stopped when the amount of electric energy in the main battery reaches a predetermined value (steps 200 to 204).

Next, the charge to the second battery is started and then the charge to the second battery is stopped when the amount of electric energy in the second battery reaches a predetermined value (steps 206 to 210). Next, the charge to the main battery is restarted and then the charge to the main battery is stopped when the amount of electric energy in the main battery reaches 100%. Thereafter, the charge to the second battery is restarted and then the charge to the secondary battery is stopped when the amount of electric energy in the second battery reaches 100% (steps 212 to 222).

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

While the invention has been particularly shown and described with reference to a preferred embodiment, it will be understood by those skilled in the art that various changes in form and detail may be made therein without departing from the spirit and scope of the invention.

Figure 9:
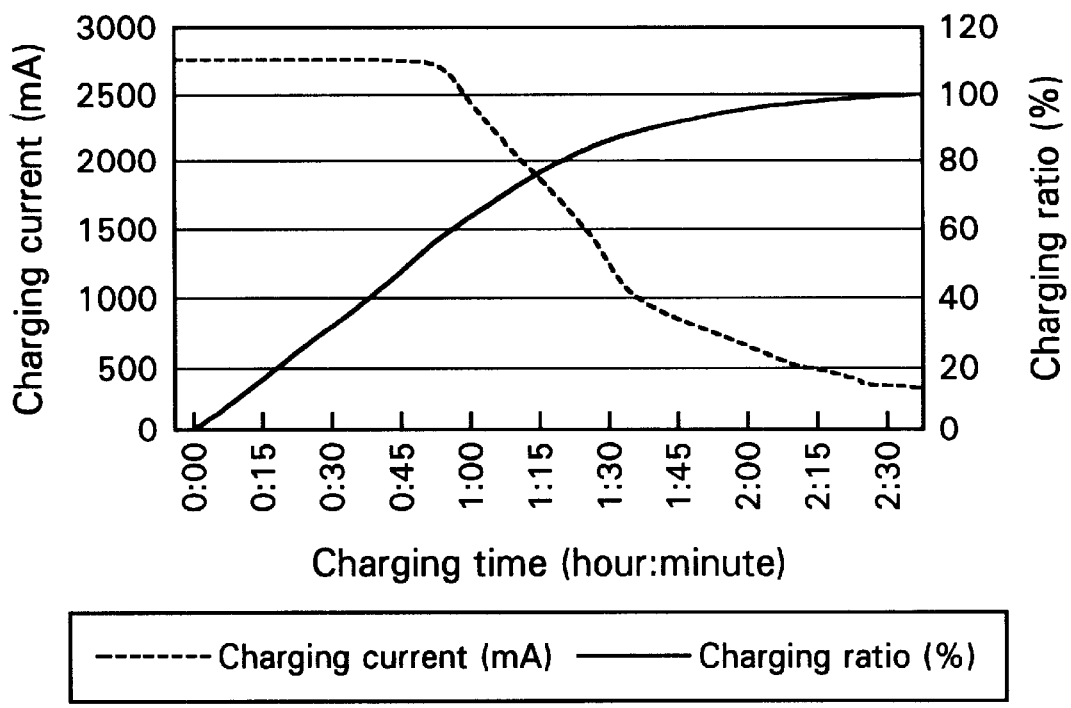
FIG. 9 is a graph for explaining the prior art and shows an example of the charging characteristics of a lithium-ion battery.

FIG. 9 shows an example of the charging characteristics of a lithium-ion battery. From the charging characteristics shown in the figure, it is found that the battery is efficiently charged until the amount of electric energy in it reaches approximately 80% of its capacity but that the charging efficiency decreases gradually thereafter. In other words, such a battery which is charged through a constant-voltage charging operation after it has been charged through a constant-current charging operation generally exhibits a high charging efficiency (that is, a ratio of the amount of charging current to the charging time) during the constant-current charging operation and a low charging efficiency during the constant-voltage charging operation.

Therefore, the above-mentioned charging process wherein the second battery is charged after the main battery has been charged may exhibit very low charging efficiency if the charging process is aborted, since the whole charging period contains an inefficient period wherein the main battery is charged (corresponding to the constant-voltage charging operation as described above).

Figure 10:
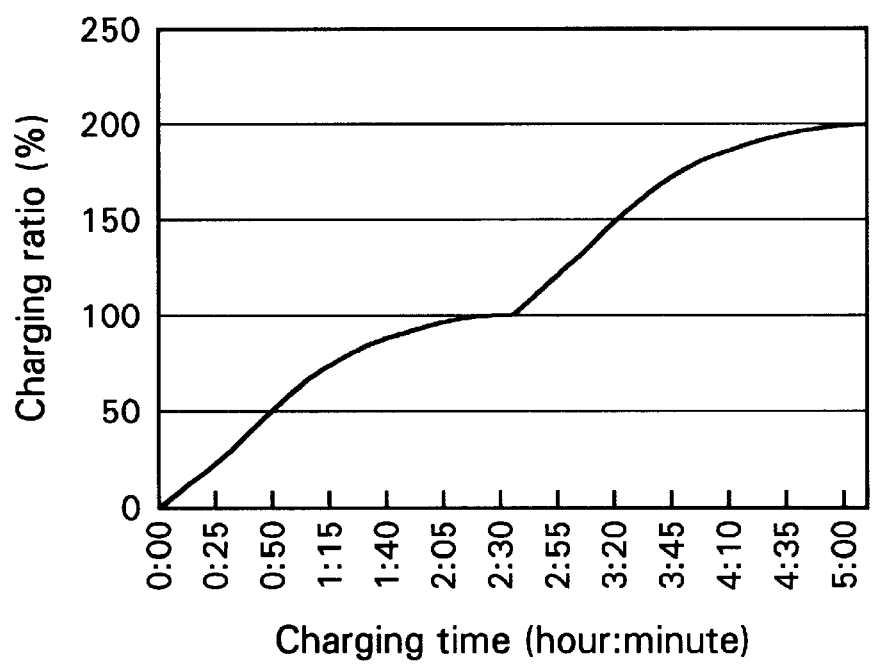
FIG. 10 is a graph for explaining problems of the prior art.

FIG. 10 shows an example of the charging characteristics for the case where the second battery is charged after the main battery has been charged. It should be appreciated that the amount of electric energy reaches 100% of a capacity when the main battery goes into its full charge state and that the amount of electric energy reaches 200% of the capacity when both the main and second batteries go into their full charge state. For the example shown in the figure, the charging efficiency remarkably deceases during the period from one and a half hours to two and a half hours after the charging process starts.

Therefore, the present invention is devised to overcome the problems described above and it is an object of the present invention to provide a charge control method by which batteries can be efficiently charged even if the charging is aborted as well as a computer which employs such a charge control method.

In accordance with a first embodiment of the present invention, a plurality of batteries are serially charged in sequence one by one by charging each of the batteries until the amount of electric energy in each battery reaches a predetermined value less than its full charge state, and then the plurality of batteries are serially charged in sequence one by one by charging each of the batteries until each battery reaches its full charge state. It is preferable that the predetermined value has been previously established as the amount of electric energy when the charging efficiency starts to decrease, based on the charging characteristics of the batteries. The expression "when the charging efficiency starts to decrease" may be interpreted as the time when a falling rate of the charging efficiency is greater than a predetermined rate.

According to a second embodiment of the present invention, a plurality of batteries are serially charged in sequence one by one by charging each of the batteries until the increase in electric energy in each battery for a predetermined period of time reaches a predetermined amount, and then the plurality of batteries are serially charged in sequence one by one by charging each of the batteries until each battery reaches its full charge state.

Moreover, according to a third embodiment of the present invention, a plurality of batteries are serially charged in sequence one by one by charging each of the s batteries until the amount of charging current in each battery reaches a predetermined value less than its full charge state, and then the plurality of batteries are serially charged in sequence one by one by charging each of the batteries until each battery reaches its full charge state.

The above embodiments are based on the principle described below. As shown in FIG. 9, the charging characteristics of a battery exhibits a drastic deterioration in charging efficiency since the amount of electric energy in it reaches a certain value during the charging process.

In each of the above embodiments, therefore, during the serial charging process for a plurality of batteries, all of the batteries are charged under circumstances of a good charging efficiency by starting to charge another battery before the battery being charged reaches its full charge state, and then the batteries are serially charged until each of the batteries reaches its full charge state. Thus, an efficient charging can be accomplished even if the charging is aborted. In addition, since the present invention is directed to serial charging only, all the batteries can be efficiently charged without the need for a complicated circuitry or control required to charge them in parallel.

Figure 1:
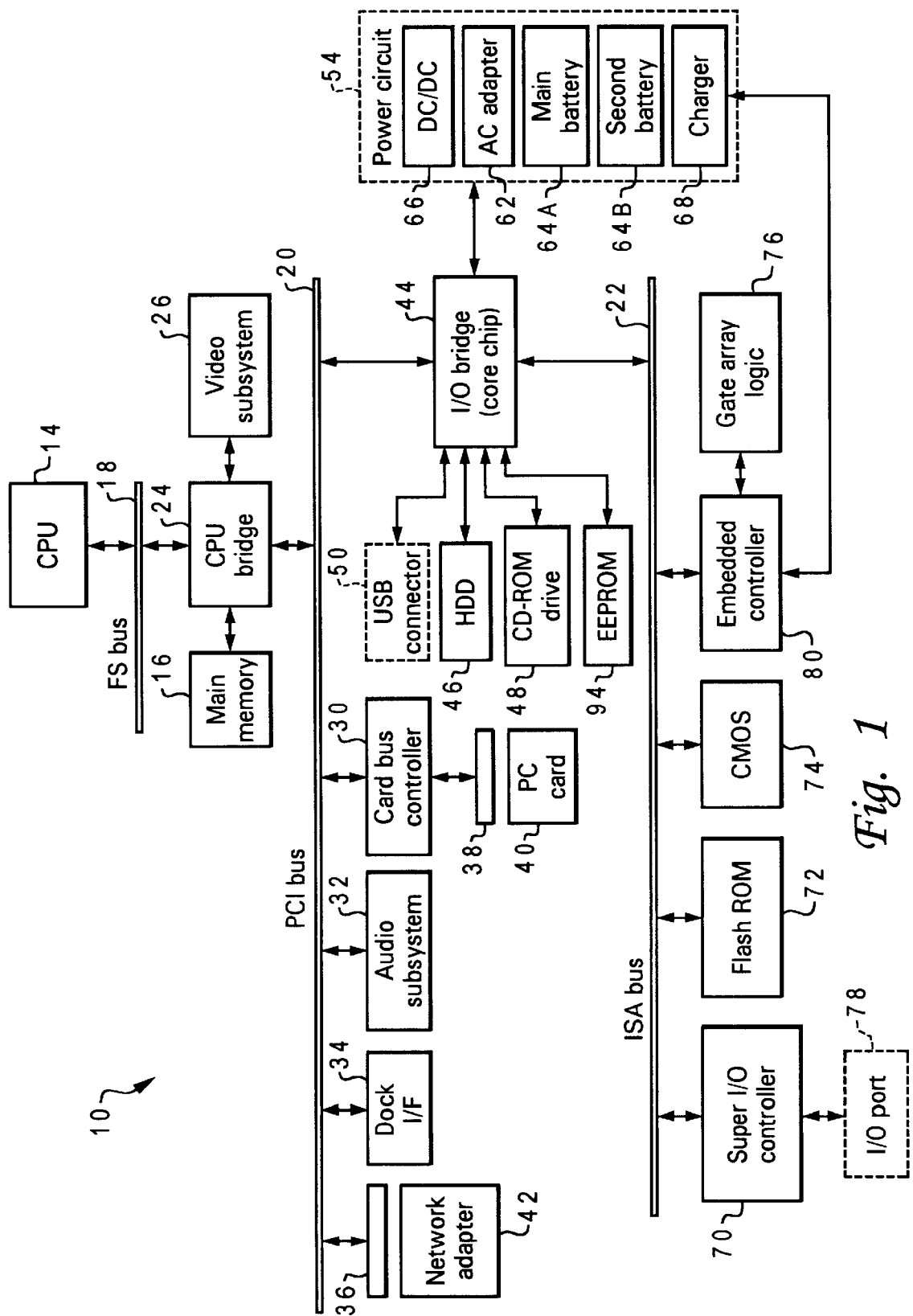
FIG. 1 is a block diagram for schematically showing the configuration of a computer system according to an embodiment.

Now, several embodiments of the present invention will be described below in detail with reference to the drawings. It should be appreciated that the present invention relates to a method for controlling the charge of a plurality of batteries but for simplicity of explanation, the present embodiment includes two batteries by way of example. In addition, the two batteries are hereinafter referred to as a main battery and a second battery, respectively First Embodiment FIG. 1 schematically shows, on a subsystem basis, the hardware configuration of a computer system 10 composed of a typical personal computer (PC) which employs the charge control method according to the present invention. An example of the PC which can employ the present invention is a notebook PC 12 (see FIG. 2) which conforms to the OADG (PC Open Architecture Developer's Group) specification and on which "Windows 98" or "Windows NT" available from Microsoft Corporation in USA or "OS/2" available from International Business Machines Corporation (IBM) in USA is installed as an operating system (OS). Now, various components of the computer system 10 will be described below.

A CPU 14 which acts as the brain for the overall computer system 10 executes various programs under the control of the OS. CPU 14 may be a CPU chip called "Pentium", "MMX technology Pentium", or "Pentium Pro" manufactured by Intel Corporation in USA, or may be a CPU manufactured by Advanced Micro Devices, Inc. (AMD) in USA or other manufacturers, or may be a CPU called "PowerPC" manufactured by IBM. The CPU 14 is configured to include an L2 (Level 2) cache which is a high-speed storage to reduce the total time for accessing a main memory 16 by temporarily storing very limited code or data to be frequently accessed. The L2-cache is generally composed of an SRAM (Static RAM) chip and has a storage capacity of, for example, 512 kB or more.

CPU 14 is interconnected with various hardware components described below via three hierarchical buses: an FS (FrontSide) bus 18 which is a processor-connected bus directly connected to its own external pins, a PCI (Peripheral Component Interconnect) bus 20 which is a bus for high-speed I/O devices, and an ISA (Industry Standard Architecture) bus 22 which is a bus for low-speed I/O devices.

FSB 18 and the PCI bus 20 are generally coupled to each other through a CPU bridge(host-PCI bridge) 24 called a memory/PCI control chip. The CPU bridge 24 according to the present embodiment is configured to include a memory controller function which controls the access to the main memory 16 and a data buffer which compensates for any difference in data transfer rate between the FSB 18 and the PCI bus 20 and it may be, for example, a 440BX manufactured by Intel Corporation.

Main memory 16 is a writeable memory used as an area into which executable programs for the CPU 14 are loaded or as a working area into which data processed by these executable programs is written. Main memory 16 is generally composed of a plurality of DRAM (Dynamic RAM) chips and it usually has a storage capacity of, for example, 32 MB but it can be expanded up to 256 MB with additional chips. For recent years, the conventional DRAMs have been replaced by high-speed page DRAMs, EDO DRAMs, synchronous DRAMs (SDRAMs), burst EDO DRAMs, or RDRAMs to meet the need for much faster storage.

The executable programs referred to hereinabove include operating systems such as Windows 98, various device drivers for operating peripheral equipment on a hardware basis, application programs adapted to specific applications, and firmware such as BIOS (Basic Input/Output System:

programs for controlling the input/output operations for a keyboard, a floppy disk drive, or any other hardware components) stored in a flash ROM 72.

PCI bus 20 is a bus which allows for relatively high speed data transmission (with, for example, a bus width of 32/64 bits, a maximum operating frequency of 33/66/100 MHz, and a maximum data transfer rate of 132/264 MBps) and PCI devices which can operate at a relatively high speed such as a card bus controller 30 are connected to it. It should be appreciated that the PCI architecture:has been initially proposed by Intel to implement so called PnP (plug-and-play) function.

Figure 2:
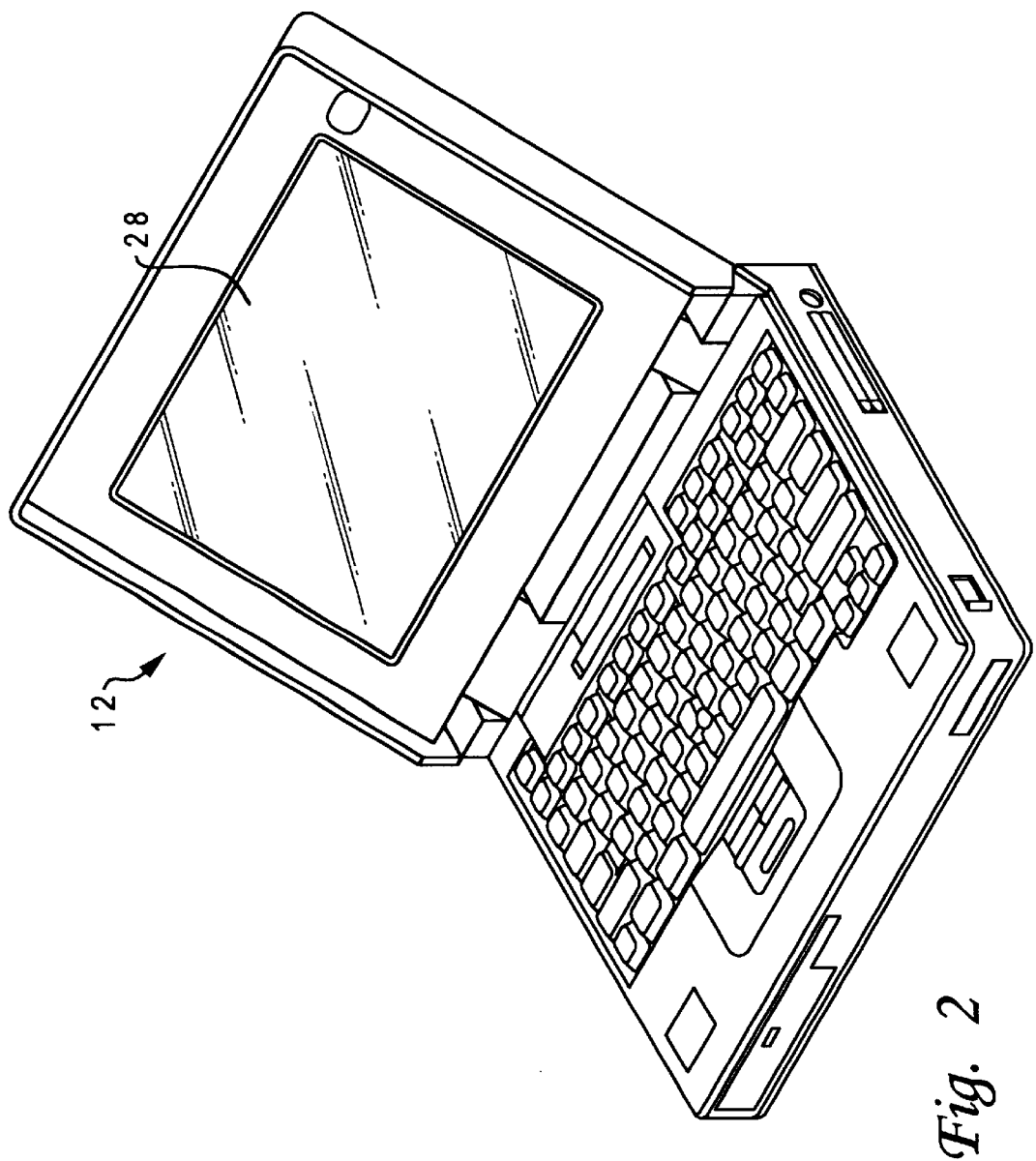
FIG. 2 is a perspective view for showing the appearance of a notebook PC.

A video subsystem 26 is a subsystem to implement video-related functions and includes a video controller to actually process a draw instruction from the CPU 14 and to write processed drawing information into a video memory (VRAM) as well as to read out the drawing information from the VRAM for displaying it as output drawing data on a liquid crystal display (LCD) 28 (see FIG. 2). The video controller can convert a digital video signal into an analog video signal through a digital-to-analog converter (DAC) provided therewith. The converted analog video signal is provided to a CRT port (not shown) through a signal line.

A card bus controller 30, an audio subsystem 32, a docking station interface (Dock I/F) 34, and a mini PCI slot 36 are connected to the PCI bus 20, respectively. Card bus controller 30 is a dedicated controller for connecting a bus signal for PCI bus 20 directly to the interface connector (card bus) of a PCI card bus slot 38. Card bus slot 38, which is located, for example, on the side of the body of the PC 12, is loaded with a PC card 40 conformable to the specification (for example, "PC Card Standard 95") established by the PCMCIA/JEIDA (Personal Computer Memory Card International Association/Japan Electronic Industry Development Association).

Dock I/F 34 is a hardware component to connect the PC 12 to a docking station (not shown) and when the PC 12 is installed on the docking station, the internal bus of the docking station is connected to the Dock I/F 34 and various hardware components connected to the internal bus of the docking station are connected to PCI bus 20 via the Dock I/F 34. A network adapter 42 is also connected to mini PCI slot 36 to connect, for example, computer system 10 to a network (for example, LAN).

PCI bus 20 and ISA bus 22 are interconnected with each other through an I/O bridge 44. I/O bridge 44 has a bridge function between the PCI bus 20 and the ISA bus 22, a DMA controller function, a programmable interrupt controller (PIC) function, a programmable interval timer (PIT) function, an IDE (Integrated Drive Electronics) interface function, an USB (Universal Serial Bus) function, and an SMB (System Management Bus) interface function and contains a real time clock (RTC). To implement this I/O bridge, for example, a device (core chip) called PIIX4 manufactured by Intel can be used.

The DMA controller function is a function to perform data transfer between any peripheral equipment (for example, an FDD) and main memory 16 without intervention of CPU 14. The PIC function is a function to cause a predetermined program (interrupt handler) to execute in response to an interrupt request (IRQ) from any peripheral equipment. The PIT function is a function to generate timer signals at predetermined intervals, which are programmable.

The IDE interface implemented by the IDE interface function has an IDE hard disk drive (HDD) 46 connected therewith and also an IDE CD-ROM drive 48 connected therewith through the ATAPI (At Attachment Packet Interface) technology. Instead of IDE CD-ROM drive 48, a DVD (Digital Video Disc or Digital Versatile Disc) drive or any other IDE device may be connected. The external storages such as HDD 46 and CD-ROM drive 48 are placed, for example, in their appropriate locations called "media bay" or "device bay" in the body of PC 12. These standard external storages may be interchangeably and exclusively installed together with other equipment such as an FDD or battery pack.

I/O bridge 44 is provided with a USB port, which is connected to a USB connector 50 provided, for example, on the wall of the body of PC 12. The USB technology supports a function to connect or disconnect new peripheral equipment (USB device) with its power on (hot plugging function) and a function to automatically recognize such newly connected peripheral equipment and reestablish the system configuration (plug-and-play function). Up to 63 USB devices can be daisy-chained to a single USB port. Exemplary USB devices include a keyboard, a mouse, a joystick, a scanner, a printer, a modem, a display monitor, and a tablet.

In addition, an EEPROM 94 is connected to the I/O bridge 44 via the SM bus. EEPROM 94 is a memory to hold information such as a user-specified password, a supervisor password, and a product serial number and it is non-volatile and electrically rewriteable.

I/O bridge 44 is connected to a power circuit 54. Power circuit 54 comprises an AC adapter 62, a charger 68 for charging a main battery 64A and a second battery 64B provided as secondary batteries, and a DC/DC converter 66 for; generating direct-current constant voltages of 5 V and 3.3 V used for the computer system 10. It should be appreciated that main battery 64A and second battery 64B are composed of three serially-connected lithium-ion batteries with a rated voltage of 4.2 V, respectively.

Within the core chip constituting I/O bridge 44, an internal register to manage;the power condition of computer system 10 and a logic (state machine) to manage the power condition of computer system 10 including the operation of the internal register are provided.

The logic sends various signals to or receives them from power circuit 54 and, by sending or receiving these signals, recognizes the actual condition of power supply from power circuit 54 to computer system 10. Power circuit 54 controls the power supply to computer system 10 according to an instruction from the logic.

ISA bus 22 is a bus having a lower data transfer rate than that of PCI bus 20 (for example, a bus width of 16 bits and a maximum data transfer rate of 4 MBps) and it is used to connect a Super I/O controller 70, a flash ROM 72 composed of an EEPROM, a CMOS 74, an embedded controller 80 which is connected to a gate array logic 76, and other peripheral equipment (not shown) which operates at a relatively low speed such as a keyboard/mouse controller.

An I/O port 78 is connected to the Super I/O controller 70. Super I/O controller 70 controls the operation of the floppy disk drive (FDD), the input/output of parallel data via a parallel port (PIO), and the input/output of serial data via a serial port (SIO).

Flash ROM 72 is a memory to hold BIOS and other programs and it is non-volatile and electrically rewritable. The,CMOS 74 is configured as having a volatile semiconductor memory connected to a backup power supply and it is a non-volatile and high-speed storage.

Embedded controller 80 controls the keyboard (not shown) and at the same time, performs part of the power management function in cooperation with gate array logic 76 through a built-in power management controller (hereinafter referred to as "PMC") 82 (see also FIG. 3). It should be appreciated that PMC 82 according to the present embodiment has a function to detect the amounts of electric energy in main battery 64A and second battery 64B (the amounts of direct current which can be provided by these batteries at that point of time) and a function to detect the amount of charging current during the charge of main battery 64A or second battery 64B.

Now, the configuration of a portion for discharging from/charging main battery 64A and second battery 64B will be described below. The configuration of a portion for discharging from main battery 64A and second battery 64B will be described first.

Figure 3:
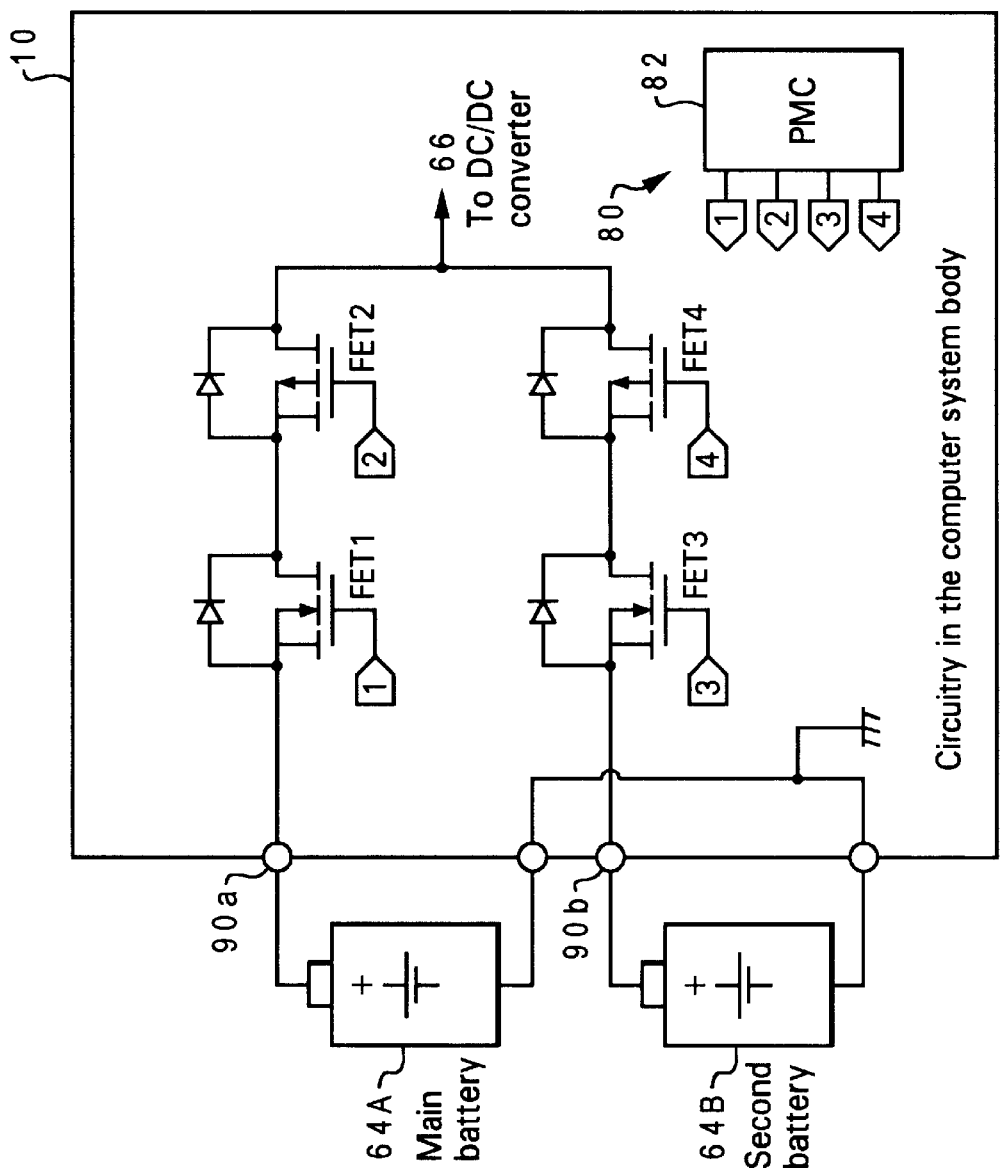
FIG. 3 is a block diagram (and a circuit diagram in part) for showing the configuration of a portion for discharging from the main battery and the second battery according to an embodiment.

FIG. 3 shows the configuration of only a portion for discharging from main battery 64A and second battery 64B. As shown in the figure, the computer system 10 has two terminals 90a and 90b to connect these batteries. MOS field effect transistors FET1 and FET2 are serially connected to t terminal 90a. FIG. 3 also shows body diodes contained in the FET1 and FET2, respectively.

Similarly, MOS field effect transistors FET3 and FET4 are serially connected to terminal 90b. The drain of the FET2 and the drain of the FET4 are interconnected to each other and they are also connected to DC/DC converter 66.

The gates of FET1, FET2, FET3, and FET4 are connected to the output terminals of PMC 82 provided in embedded controller 80, respectively and the switching operation (on/off) of each of FET1 to FET4 can be individually set by PMC 82.

The positive electrode of main battery 64A is connected to terminal 90a and the positive electrode of second battery 64B is connected to terminal 90b. In addition, the negative electrodes of main battery 64A and the second battery 64B are both connected to ground (GND).

Next, the configuration of a portion for charging main battery 64A and second battery 64B will be described.

Figure 4:
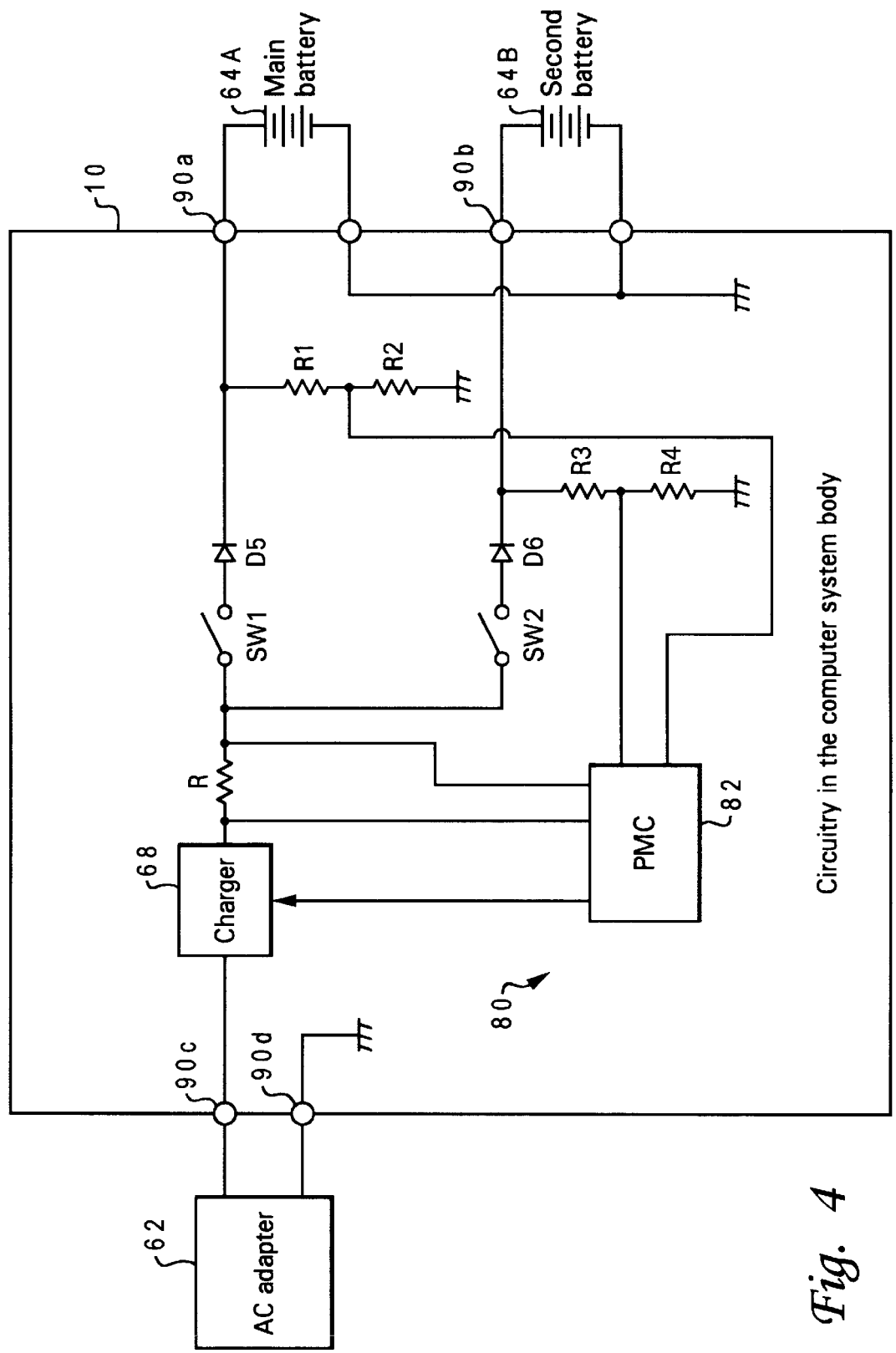
FIG. 4 is a block diagram (and a circuit diagram in part) for showing the configuration of a portion for charging the main battery and the second battery according to an embodiment.

FIG. 4 shows the configuration of only a portion for charging main battery 64A and second battery 64B. As shown in the figure, computer system 10 has a charger 68, one end of which is connected to a terminal 90c. The other end of charger 68 is divided into two paths after a resistor R. One of them is connected to terminal 90a through a switch SW1 and a diode D5. The other is connected to terminal 90b through a switch SW2 and a diode D6.

Both ends of the resistor R are connected to input terminals of PMC 82 provided in embedded controller 80, respectively and PMC 82 is configured to continuously detect the amount of charging current based on a voltage across the resistor R.

A resistor series consisting of resistors R1 and R2 is connected to terminal 90a. Another resistor series consisting of resistors R3 and R4 is connected to terminal 90b. The midpoint of the resistor series of R1 and R2 and the midpoint of the resistor series of R3 and R4 are connected to input terminals of PMC 82, respectively. The output terminal of PMC 82 is connected to charger 68. In addition, terminal 90d is connected to ground (GND).

As described above, terminal 90a is connected to main battery 64A and terminal 90b is connected to second battery 64B. Main battery 64A and second battery 64B are implemented by batteries which can be recharged. It should be appreciated that main battery 64A and second battery 64B can take the form of a battery pack which can be installed on/removed from the body of computer system 10.

The above-mentioned configuration allows PMC 82 to continuously accept a voltage obtained by dividing a voltage of main battery 64A through the resistor series of R1 and R2 and PMC 82 has a table previously provided therein to determine the amount of electric energy in main battery 64A from the divided voltage described above. Thus, PMC 82 is configured to continuously detect the amount of electric energy in main battery 64A by looking up the table.

Similarly, the above-mentioned configuration allows the PMC 82 to continuously accept a voltage obtained by dividing a voltage of second battery 64A through the resistor series of R3 and R4 and PMC 82 has another table previously provided therein to determine the amount of electric energy in second battery 64B from the divided voltage described above. Thus, PMC 82 is configured to continuously detect the amount of electric energy in second battery 64B by looking up the table.

Under circumstances wherein commercial electric power is available to computer system 10, the user connects AC adapter 62 to terminals 90c and 90d. The electric power supplied by the AC adapter 62 is used to charge main battery 64A and second battery 64B.

Now, the term "C" used hereinafter will be described here. The term "C" is also referred to as a nominal capacity (rated capacity) of a battery and is commonly expressed simply as "C". Specifically, the expression "1 C" indicates a current flowing while a battery with a certain rated capacity is discharged in an hour. For example, when a battery;having a rated capacity of 2450 mAh is discharged at 2450 mA, it can be expressed that the battery is discharged at 1 C.

Therefore, the discharge at 0.1 C means that the battery is discharged at 245 mA (=2450 mA'0.1). The term "C" can be used for a charging current in the similar manner to such a discharging current.

In general, the rated capacity of a battery can be defined as a capacity when the battery is charged at 0.2 C to 1 C and discharged at 0.2 C.

It should be appreciated that many electric circuits other than those shown in FIG. 1 are required to configure computer system 10. These circuits will not be further described herein, because they are well known to those skilled in the art and are not essential to the present invention. It should be also appreciated that only some of the connections between hardware blocks are shown in the drawings in order to avoid complexity.

Now, the operation for discharging from/charging main battery 64A and,second battery 64B according to the present embodiment will be described is below. The discharging operation will be described first with reference to FIG. 3.

First, PMC 82 turns off the FET1 and FET2 and turns on the FET3 and FET4 to start the discharge from second battery 64B to DC-DC converter 66.

During the discharge of second battery 64B, PMC 82 continuously checks whether any electric energy remains in second battery 64B. It should be appreciated that the amount of electric energy in second battery 64B can be determined by dividing a voltage of second battery 64B through the resistor series of R3 and R4 and by looking up the above-mentioned table based on the divided voltage in the configuration shown in FIG. 4.

As a result of the check, when it is determined that no electric energy remains in second battery 64B, PMC 82 turns on the FET1 and FET2 and turns off the FET3 and FET4 to stop the discharge from second battery 64B as well as to start the discharge from main battery 64A to DC-DC converter 66.

Now, the discharging operation has been finished.

Figure 5:
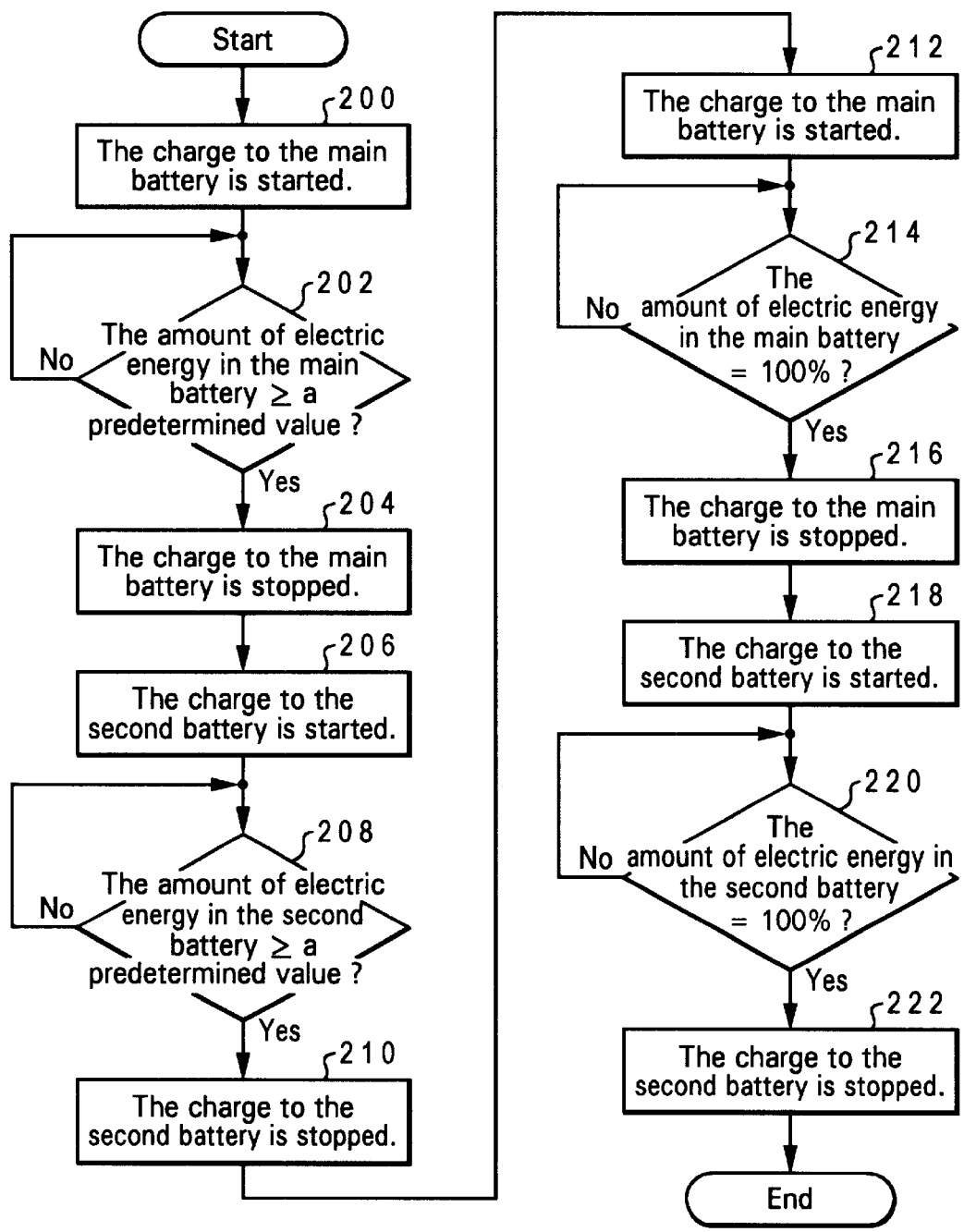
FIG. 5 is a flow chart for explaining the charging operation according to a first embodiment.

Next, the charging operation will be described below with reference to FIGS. 4 and 5. It should be appreciated that AC adapter 62 according to the present embodiment has a capacity which can charged at 0.7 C. It should be also appreciated that main battery 64A and second battery 64B exhibit the charging characteristics shown in FIG. 9.

At step 200, the charge to main battery 64A is started by closing the switch SW1. It should be appreciated that the charging process used for this purpose consists of a constant-current charging operation and a constant-voltage charging operation. It should be also appreciated that the initial constant-current charging operation is performed at 0.7 C.

Next, at step 202, it is determined whether the amount of electric energy in main battery 64A is equal to or greater than a predetermined value. The process goes to step 204 if it is equal to or greater than the predetermined value (positive determination), and the charge to t main battery 64A continues if it is less than the predetermined value (negative determination). It should be appreciated that the predetermined value has been previously established as the amount of electric energy when the charging efficiency starts to decrease, based on the charging characteristics shown in FIG. 9 and that the predetermined value according to the present embodiment has been previously established as 80%.

Furthermore, according to the present embodiment, the amount of electric energy in main battery 64A is determined by looking up the table based on the voltage of main battery 64A as described above.

At step 204, the charge to main battery 64A is stopped by opening the switch SW1 and then, at step 206, the charge to second battery 64B is started by closing the switch SW2. It should be appreciated that like the charging process for main battery 64A, the charging process used for this purpose consists of a constant-current charging operation and a constant-voltage charging operation. It should be also appreciated that the initial constant-current charging operation is performed at 0.7 C.

Next, at step 208, it is determined whether the amount of electric energy in second battery 64B is equal to or greater than a predetermined value. The process goes to step 210 if it is equal to or greater than the predetermined value (positive determination), and the charge to second battery 64B continues if it is less than the predetermined value (negative determination). It should be appreciated that the predetermined value has been also previously established as the amount of electric energy when the charging efficiency starts to decrease, based on the charging characteristics shown in FIG. 9 and that the predetermined value according to the present embodiment has been previously established as 80%. Furthermore, according to the present embodiment, the amount of electric energy in second battery 64B is determined by looking up the table based on the voltage of second battery 64B as described above.

At step 210, the charge to second battery 64B is stopped by opening the switch SW2 and then, at step 212, the charge to main battery 64A is started (restarted) by closing the switch SW1.

Next, at step 214, it is determined whether the amount of electric energy in main battery 64A reaches 100%. The process goes to step 216 if it reaches 100% (positive determination), and the charge to main battery 64A continues if it does not reach 100% (negative determination).

At step 216, the charge to main battery 64A is stopped by opening the switch SW1 and then, at step 218, the charge to second battery 64B is started (restarted) by closing the switch SW2.

Next, at step 220, it is determined whether the amount of electric energy in second battery 64B reaches 100%. The process goes to step 222 if it reaches 100% (positive determination), and the charge to second battery 64B continues if it does not reach 100% (negative determination). At step 222, the charge to the second battery 64B is stopped by opening the switch SW2. Now, the charging operation has been finished.

Figure 6:
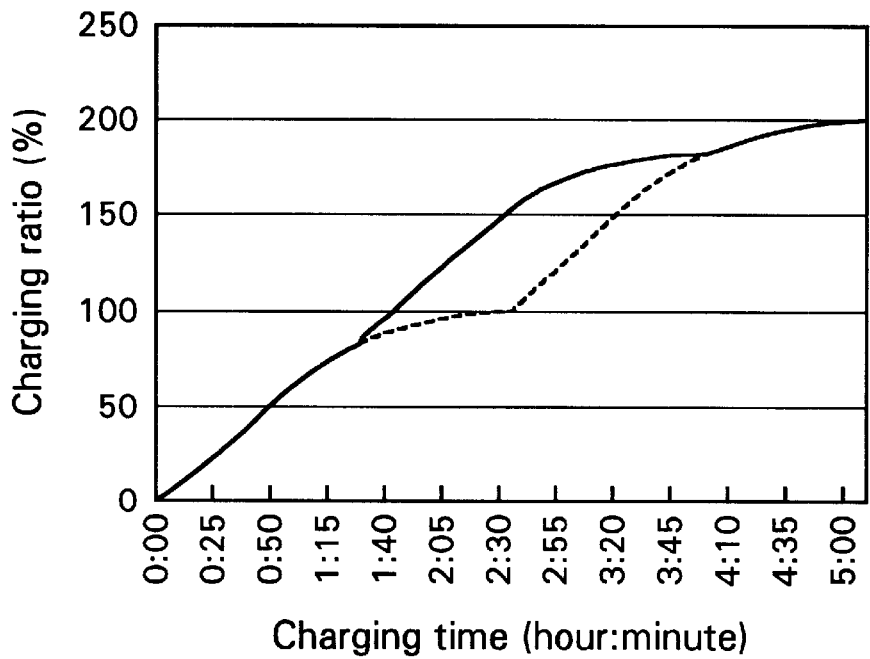
FIG. 6 is a graph for explaining the effects of the charge control method according to the first embodiment.

FIG. 6 shows an example of transitional charging ratios, one of which is obtained when a second battery is charged after a main battery has been charged according to the prior art and the other of which is obtained when the charge is performed according to the charge control method of the present first embodiment.

As shown in the figure, it is found that the present charge control method exhibits a higher charging ratio than the prior charge control method if the charge is stopped at a point of time between one and a half hours to four hours after the charging process starts. It should be appreciated that the present method does not under perform the prior method in charging ratio even if the charge is stopped at any point of time.

As described above in detail, in the charge control method according to the first embodiment of the present invention, a plurality of batteries are serially charged in sequence one by one by charging each of the batteries until the amount of electric energy in the battery reaches a predetermined value less than its full charge state, and then the plurality of batteries are serially charged in sequence one by one by charging each of the batteries until the battery reaches its full charge state. Therefore, regardless of the discharging condition of a battery (the amount of electric energy remaining in it), an efficient charging can be accomplished even if the charging is aborted.

In addition, since the charge control method according to the first embodiment of the present invention is directed to serial charging only, all the batteries can be efficiently charged without the need for a complicated circuitry or control required to charge them in parallel.

It should be further appreciated that according to the first embodiment, the charge to another battery is started when the amount of electric energy in a battery being charged reaches a predetermined value. However, the present invention is not limited to this embodiment and may be implemented by another embodiment, for example, wherein the charge to another battery is started when a previously established charging time required for the amount of electric energy in a battery being charged to reach the predetermined value has elapsed. This can allow for reduction in cost and size because no means is required to determine the amount of electric energy in a battery.

Second Embodiment

As described above, according to the first embodiment, the charge to one of main battery 64A and second battery 64B is started when the amount of electric energy in the other battery reaches a predetermined value which has been previously established based on the charging characteristics. On the contrary, according to the second embodiment, the charge to one of main battery 64A and second battery 64B is started when the increasing rate of electric energy in the other battery (the increase in electric energy in the other battery for a predetermined period of time) is equal to or less than a predetermined value. It should be appreciated that the configuration of a computer system. according to the second embodiment will not be further described below, since that is similar to the configuration of computer system 10 according to the first embodiment described above. It should be also appreciated that the discharging operation for the main battery 64A and the second battery 64B according to the second embodiment will not be further described below, since that is similar to the discharging operation according to the first embodiment described above.

Now, the operation for charging main battery 64A and second battery 64B according to the second embodiment will be described below with reference to FIG. 7. It should be appreciated that a step in FIG. 7 similar to any one in FIG. 5 is designated by the same number as in FIG. 5 and will not be further described below.

Figure 7:
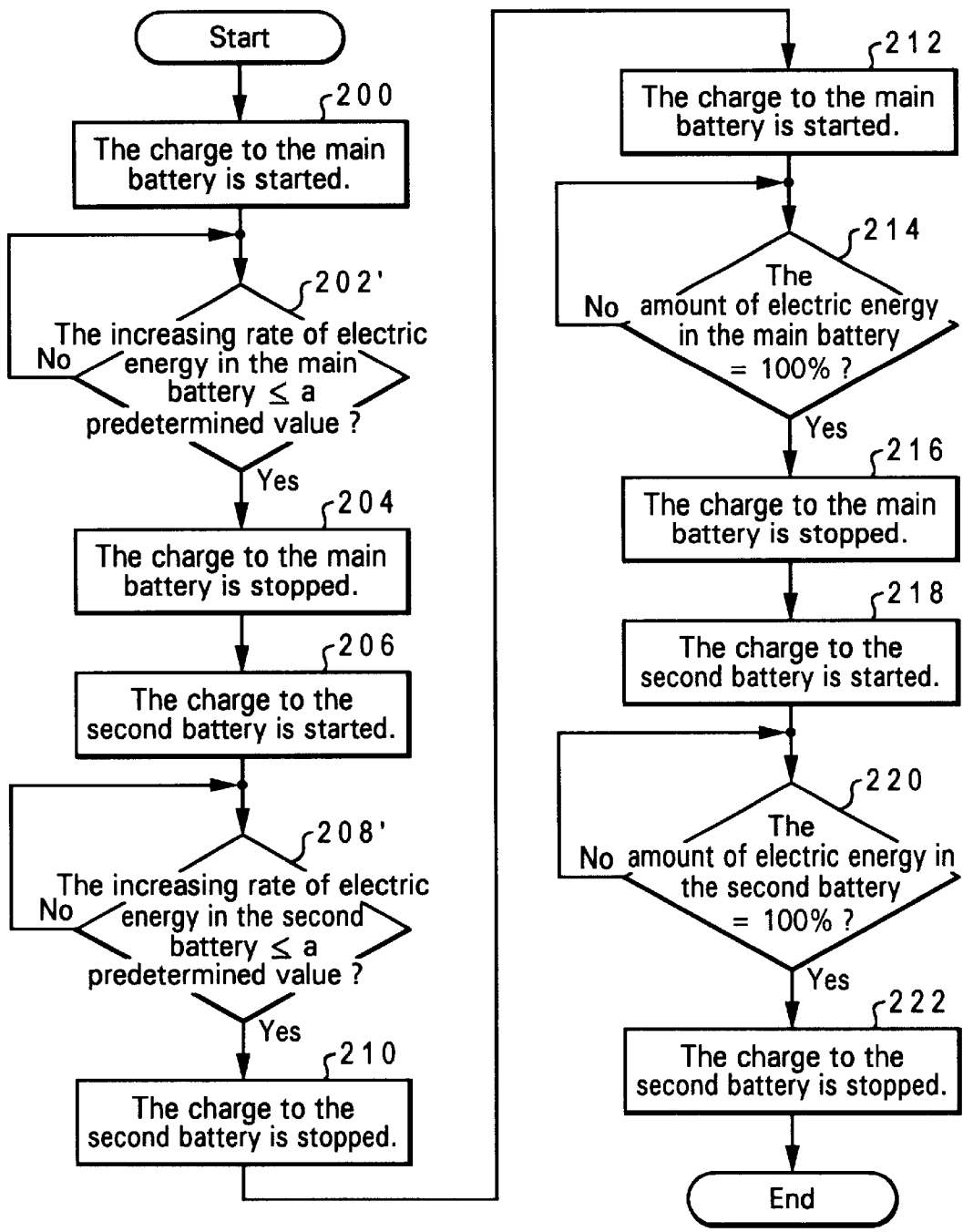
FIG. 7 is a flow chart for explaining the charging operation according to a second embodiment.

At step 202' in FIG. 7, it is determined whether the increasing rate of electric energy in main battery 64A is equal to or less than a predetermined value. The process goes to step 204 if it is equal to or less than the predetermined value (positive determination), and the charge to main battery 64A continues if it is greater than the predetermined value (negative determination). It should be appreciated that the predetermined value has been previously established as a criterion used to determine that the charging efficiency is decreased when the increasing rate of electric energy in the main battery 64A (the increase in electric energy in the battery for a predetermined period of time) is equal to or less than this value. It should be further appreciated that the predetermined period of time has been established as 5 minutes and the predetermined value has been established as 5% according to the present embodiment.

Similarly, at step 208' in FIG. 7, it is determined whether the increasing rate of electric energy in second battery 64B is equal to or less than a predetermined value. The process goes to step 210 if it is equal to or less than the predetermined value (positive determination), and the charge to second battery 64B continues if it is greater than the predetermined value (negative determination). It should be appreciated that like the above-mentioned value for main battery 64A, the predetermined value has been previously established as a criterion used to determine that the charging efficiency is decreased when the increasing rate of electric energy in second battery 64B is equal to or less than this value. It should be further appreciated that the predetermined period of time has been established as 5 minutes and the predetermined value has been established as 5% according to the present embodiment in similar manner to those for main battery 64A.

As described above in detail, in the charge control method according to the second embodiment of the present invention, a plurality of batteries are serially charged in sequence one by one by charging each of the batteries until the increase in electric energy in the battery for a predetermined period of time reaches a predetermined amount, and then the plurality of batteries are serially charged in sequence one by one by charging each of the batteries until the battery reaches its full charge state. Therefore, the second embodiment can achieve similar effects to those of the first embodiment and at the same time, it can establish a relatively appropriate timing for starting the charge to another battery, regardless of air temperature, humidity, and other environmental conditions during the charging operation or type of batteries to be charged.

It should be appreciated, that according to the second embodiment, a threshold (corresponding to the predetermined value described above) for starting the charge to another battery has been previously established and it is used to determine that the charging efficiency is decreased when the increasing rate of electric energy in a battery is equal to or less than this value. However, the present invention is not limited to this embodiment and may be implemented by another embodiment, for example, wherein the charge to another battery is started when the increasing rate of electric energy in a battery being charged is less than the previous increasing rate (that at a time of 5 minutes before according to the second embodiment) by a predetermined percentage (for example, 50%).

This can also establish a relatively appropriate timing, regardless of air temperature, humidity, and other environmental conditions during the charging operation or type of batteries to be charged.

In addition, according to the first and second embodiments, the amount of electric energy in a battery is determined by measuring a voltage at the battery. However, the present invention is not limited to these embodiments and may be implemented by another embodiment, for example, wherein a battery pack transmits to the PMC 82 some information for indicating the amount of electric energy in the battery or a voltage at the battery or wherein the amount of electric energy in a battery is determined by calculating from the charging and discharging current values for the battery.

Third Embodiment

As described above, according to the first and second embodiments, the charge to one of the batteries is started based on the comparison between the amount of electric energy or the increasing rate of electric energy in the other battery and a predetermined value. On the contrary, according to the third embodiment, the charge to one of the batteries is started based on the comparison between the amount of charging current and a predetermined current value. It should be appreciated that the configuration of a computer system according to the third embodiment will not be further described below, since that is similar to the configuration of computer system 10 according to the first embodiment described above. It should be also appreciated that the discharging operation for main battery 64A and second battery 64B according to the third embodiment will not be further described below, since that is similar to the discharging operation according to the first embodiment described above.

Now, the operation for charging main battery 64A and second battery 64B according to the third embodiment will be described below with reference to FIG. 8. It should be appreciated that a step in FIG. 8 similar to any one in FIG. 5 is designated by the same number as in FIG. 5 and will not be further described below.

Figure 8:
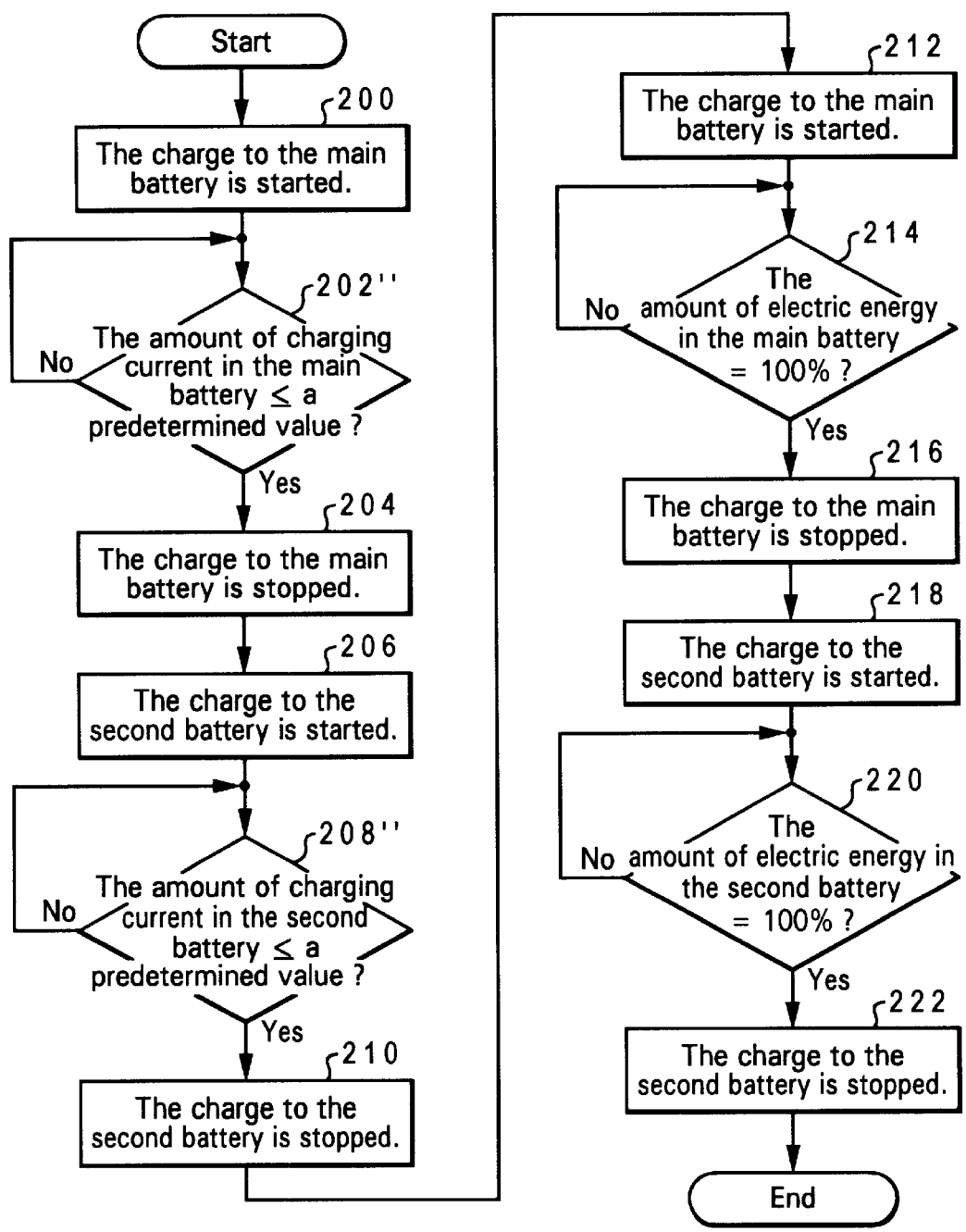
FIG. 8 is a flow chart for explaining the charging operation according to a third embodiment.

At step 202" in FIG. 8, it is determined whether the amount of charging current in main battery 64A is equal to or less than a predetermined current value. The process goes to step 204 if it is equal to or less than the predetermined current value (positive determination), and the charge to main battery 64A continues if it is greater than the predetermined current value (negative determination). It should be appreciated that the amount of charging current in the main battery 64A is obtained from a voltage across the resistor R.

Similarly, at step 208" in FIG. 8, it is determined whether the amount of charging current in second battery 64B is equal to or less than a predetermined current value. The process goes to step 210 if it is equal to or less than the predetermined current value (positive determination), and the charge to second battery 64B continues if it is greater than the predetermined current value (negative determination). It should be appreciated that like the above-mentioned amount for main battery 64A, the amount of charging current in second battery 64B is obtained from a voltage across the resistor R.

As described above in detail, in the charge control method according to the third embodiment of the present invention, a plurality of batteries are serially charged in sequence one by one by charging each of the batteries until the amount of charging current in the battery reaches a predetermined value less than its full charge state, and then the plurality of batteries are serially charged in sequence one by one by charging each of the batteries until the battery reaches its full charge state. Therefore, the third embodiment can achieve similar effects to those of the first embodiment and at the same time, it can establish a relatively appropriate timing for starting the charge to another battery, regardless of air temperature, humidity, and other environmental conditions during the charging operation or type of batteries to be charged.

According to the first, second, and third embodiments, the present invention is applicable to the two batteries, that is, main battery 64A and second battery 64B. However, the present invention is not limited to these embodiments and may be applicable to another embodiment, for example, wherein three or more batteries are provided.

It should be further appreciated that the charge control method according to each of the above-mentioned embodiments can be programmed using any one of various programming languages (the resulting program is hereinafter referred to as "charge control program").

The charge control program can be recorded on a computer-readable recording medium. Typical recording media include a storage device which is installed on a computer system such as a ROM (Read Only Memory), an EEPROM (Electrically Erasable Programmable Read Only Memory), and a Flash EEPROM, a portable recording medium such as a floppy disk (FD), a CD-ROM (compact disk read-only memory), and an MO (magneto-optical) disk, and an external storage device provided in a server computer connected to a network.

The charge control program recorded on a recording medium can be loaded into a computer as described below. If the charge control program according to each of the above-mentioned embodiments has been recorded on a portable recording medium, that medium is first inserted in an appropriate drive to load the charge control program from the medium into the computer. Then the loaded charge control program is stored in the main memory.

If the charge control program has been recorded on an external storage device in a network, the charge control program is downloaded from the external storage device through a network connecting device. Then the downloaded charge control program is stored in the main memory.

From the foregoing, according to the present invention, during the serial charging process for a plurality of batteries, all of the batteries are charged under circumstances of a good charging efficiency by starting to charge another battery before the battery being charged reaches its full charge state, and then the batteries are serially charged until each of the batteries reaches its full charge state. Thus, an efficient charging can be accomplished even if the charging is aborted. In addition, since the present invention is directed to serial charging only, all the batteries can be efficiently charged without the need for a complicated circuitry or control required to charge them in parallel While the invention has been particularly shown and described with reference to a preferred embodiment, it will be understood by those skilled in the art that various changes in form and detail may be made therein without departing from the spirit and scope of the invention.

What is claimed is:

1. A charge control method for controlling a charge of a plurality of batteries, comprising the steps of:

specifying a predetermined value of electrical energy below which a battery may be efficiently charged;

serially charging said plurality of batteries in sequence one by one by charging each of said batteries until an amount of electric energy in said each battery reaches said predetermined value wherein said predetermined value is less than a fully charged state; and thereafter, serially charging said plurality of batteries in sequence one by one by charging each of said batteries until each said battery reaches its fully charged state.

2. A charge control method for controlling a charge of a plurality of batteries through a constant-current charging operation and a constant-voltage charging operation, comprising the steps of:

specifying a predetermined value of charging current below which a battery may be efficiently charged;

serially charging said plurality of batteries in sequence one by one by charging each of said batteries until the amount of charging current in each said battery reaches said predetermined value wherein said predetermined value is less than a fully charged state; and serially charging said plurality of batteries in sequence one by one by charging each of said batteries until each said battery reaches its fully charged state.

3. A computer-readable recording medium which has recorded a program for controlling a charge of a plurality of batteries, said program comprising the computer implemented steps of:

specifying a predetermined value of electrical energy below which a battery may be efficiently charged;

serially charging said plurality of batteries in sequence one by one by charging each of said batteries until the amount of electric energy in each said battery reaches a predetermined value less than its fully charged state; and serially charging said plurality of batteries in sequence one by one by charging each of said batteries until each said battery reaches its fully charged state.

4. A computer-readable recording medium which has recorded a program for controlling a charge of a plurality of batteries through a constant-current charging operation and a constant-voltage charging operation, said program comprising the computer implemented steps of:

specifying a predetermined value of charging current below which a battery may be efficiently charged;

serially charging said plurality of batteries in sequence one by one by charging each of said batteries until the amount of charging current in each said battery reaches said predetermined value wherein said predetermined value is less than a fully charged state; and serially charging said plurality of batteries in sequence one by one by charging each of said batteries until each said battery reaches its fully charged state.

* * * * *